(12) United States Patent
Akel et al.

(10) Patent No.: US 6,498,325 B1
(45) Date of Patent: Dec. 24, 2002

(54) MODULAR INDUCTION HEATED COOKING HOB HAVING REDUCED RADIATION AND A METHOD OF MAKING THE SAME

(75) Inventors: Dominique Akel; Henri Schlumberger, both of Paris (FR)

(73) Assignee: Jaeger Regulation, Paris (FR)

( * ) Notice: Subject to any disclaimer, the term of this patent is extended or adjusted under 35 U.S.C. 154(b) by 0 days.

(21) Appl. No.: 09/545,693

(22) Filed: Apr. 7, 2000

(51) Int. Cl.$^7$ ............................... H05B 6/12; H05B 6/44
(52) U.S. Cl. ...................... 219/624; 219/675; 219/673; 219/627; 336/225; 336/232
(58) Field of Search ................................. 219/622, 624, 219/623, 626, 627, 665, 667, 672, 673, 675, 676; 99/DIG. 14, 451; 336/225, 232, 223, 224

(56) References Cited

U.S. PATENT DOCUMENTS

| | | | | |
|---|---|---|---|---|
| 3,632,944 A | * | 1/1972 | Lease ........................ | 219/622 |
| 3,786,220 A | * | 1/1974 | Harnden, Jr. ............... | 219/622 |
| 3,843,857 A | * | 10/1974 | Cunningham ............... | 219/622 |
| 4,319,109 A | * | 3/1982 | Bowles ....................... | 219/626 |
| 4,833,288 A | * | 5/1989 | Poumey ...................... | 219/622 |
| 4,987,828 A | * | 1/1991 | Nuns et al. ................. | 219/622 |
| 5,134,265 A | * | 7/1992 | Dickens et al. ............. | 219/624 |
| 5,369,249 A | * | 11/1994 | Kwon ........................ | 219/624 |
| 5,376,774 A | * | 12/1994 | McGaffigan et al. ........ | 219/624 |
| 5,808,280 A | * | 9/1998 | Gaspard ..................... | 219/624 |

* cited by examiner

*Primary Examiner*—Philip H. Leung
(74) *Attorney, Agent, or Firm*—Drinker Biddle & Reath LLP

(57) ABSTRACT

A modular induction heated cooking hob inductor and hob are disclosed. The inductor is a wound conductor having turns at substantially right angles to previous turns. Parallel turns of the conductor are separated by a layer of insulation adjacent to the turns of the conductor. The hob may comprise multiple inductors. The inductor may have sensors for detecting a device to be heated and/or illuminatable segments that light up in response to the presence of an object to be heated.

19 Claims, 3 Drawing Sheets

Figure 5

MODULAR INDUCTION HEATED COOKING HOB HAVING REDUCED RADIATION AND A METHOD OF MAKING THE SAME

BACKGROUND OF THE INVENTION

Induction heating consists in generating what are referred to as eddy currents in an electrically-conducting element by means of a magnetic field. The magnetic field is generated by an inductor, adapted to match the region of the item to be heated, through which an alternating current is passed. The alternating current is itself produced by a generator, which adapts the frequency and amplitude of the current to produce the desired heating.

When using induction heating for cooking purposes, the object to be heated is an electricity-conducting receptacle. Although the invention described below may be applied to non-magnetic materials of the copper or aluminum type, heating magnetic materials is more specifically of interest (low-carbon steels, cast irons, magnetic inoxidizable materials). In the applications sold to the general public, the receptacle is generally of a diameter of between 120 and 280 mm and is between 1 and 4 mm thick. These diameters may be as much as 450 mm and the thickness 10 mm in professional applications.

The formula of skin thickness divided by the relative magnetic permeability $\mu_r$ and electric conductivity $\sigma$ of the recipient is applied:

$$\delta = \sqrt{2/\mu_o \mu_r \sigma \omega}$$

which gives the frequency:

$$f = \omega/2\pi$$

being in the order of 10–50 kHz, used to produce effective heating in ferritic bases of a minimum thickness of 1 mm. The supply voltage of 50 or 60 Hz distribution network is generally rectified and filtered; the excitation frequency is produced by means of a generator, generally by resonance. This generator is connected to a generally flat inductor (referred to as a "pancake") placed facing the base of the pan to be heated underneath an electrical insulation material and acting as a support for a plate, usually glass ceramic.

One of the difficulties of this known system is that of being able to heat receptacles of different materials, shapes and diameters, which are not known in advance, uniformly and in the best adapted manner. The designer of such a product has to strike a compromise by opting for an inductor of a diameter somewhere between the smallest and the biggest receptacle likely to be heated, generally about 180 mm. As cooking appliances of this type are more widely sold, manufacturers are now starting to sell specialised hobs of different diameters selected for a specific type of receptacle: hobs of 140 mm for small receptacles, hobs of 220 mm for large receptacles and even hobs of 280 mm for very large receptacles. The bigger the hob is, the higher the power must be. Each hob is therefore supplied by a different generator, a solution which is not industrially or economically attractive. Having studied the inductor, it is possible, by altering the number of turns and the space between two successive turns, to provide an arrangement in which the complex impedance $Z = R + j \cdot L \cdot \phi$ in inductors of different diameters under load is more or less identical, which means that the same generators can be used on hobs of different dimensions. The power rating which is then defined for the hob of the largest diameter is limited when applied to hobs of small diameters. This solution is not economically attractive either because it means using high-power generators to transmit low power.

Some manufacturers use a high-power generator to supply different hobs by incorporating an electromechanical switch. Although this solution allows the power to be regulated from one hob to another by varying the cyclical ratio, it is not satisfactory in terms of cooking and operating noise. It should be pointed out that the impedance (L, R) of an inductor increases with the number of turns. Conventional inductors are made up of a strand of several wires of a small section wound in a spiral, either in turns one around the other or, if the space between the turn must be variable, on a matrix. An inductor of a small diameter will therefore have a lower impedance than a larger inductor and the generator will transmit, as a first approximation, a higher power $P = R \cdot I^2$ in the small inductors, which is the opposite of the desired objective.

Finally, in the conventional application where the inductor is a simple coil, the centre of the load which corresponds to the centre of the coil is relatively large and is not heated by induction which means that the heat distribution may not be acceptable unless the receptable has good heat diffusion properties.

A second difficulty of the known system is that of avoiding irradiation of a magnetic field in the immediate area around the inductor where the user is likely to be. In practice, the system must be able to work with small receptacles, even with receptacles positioned off-centre. If the ratio of the size of the inductor to the size of the receptacle is high, then coupling will be mediocre, affecting the energy output. The effect of this is to generate a large leakage field in the immediate vicinity of the inductor. In the past, the standards governing electromagnetic compatibility have made it compulsory to limit this field. More recently, there has been a further sharp cut in the permissible levels due to the possibility of the appliance user being exposed to these leakage fields and the potential hazards it might pose to health.

Adapting the size of the inductor system to suit the load as proposed in document EP-92 400 362.2 is one way of reducing the leakage field. However, this method is not sufficient, even assuming the system were adapted turn by turn.

Another known approach is to place inductors in pairs in phase and in phase opposition, these inductors being in series so that an identical current can be passed through them. This latter concept, which has long been known (document EP-86 17 273), if difficult to apply because if a simple inductor is divided into inductor pieces, the effect of mutual inductance between one turn and the other turns in its vicinity will be considerably reduced, which will lead to a drop in the impedance of the conductor. Consequently, the current remains high even though the designer has opted for a generator system suited to low impedance levels.

In addition, because the total current from the generator passes through the turns, they must have a large section, which presents an added difficulty in terms of fitting in adequate number of turns (ampere turns) underneath the load to be heated. Accordingly, it is necessary to try and reduce the section of the conductor and still allow the inductor to heat, it also being possible for the inductor to be cooled by the load (document FR-96 05 978). This solution is of interest but is difficult to implement and implies a significant increase to the temperature of the interface, cancelling out one of the interesting features of induction, heating, whereby a "cold" medium can be used for cooking, and hence increasing the risk of accidents due to burning.

SUMMARY OF THE INVENTION

The objective of the present invention is to propose an inductor for cooking by induction heating that is simple in design and exhibits a high impedance so that it can be used in conjunction with other similar inductors to form an induction-heated cooking hob and in which combinations in parallel or in parallel series and in phase opposition will make it possible to produce a full range of hobs whilst keeping the level of magnetic disturbance to a very low level, regardless of the type of receptacle to be heated on the hob or more generally the heating surface.

To this end, the invention relates to an induction-heated cooking hob of the type defined above, characterised by:

at least one inductor made up of a large number of turns with at least one conductor, the conductor is rectangular in section and of a small thickness, the large face of the section being parallel with the winding axis of the conductor forming the turns, a layer of insulation of a minimum small thickness between adjacent turns, the winding is substantially rectangular in shape when seen in a plan view.

This high-impedance inductor requiring a reduced amount of space can be supplied by a single low-power generator; it may also be used in conjunction with other pairs of generator inductors to form cooking surfaces of different sizes and powers.

The inductor is wound in a spiral by winding the conductor around a rectangular shape so as to cover a surface facing the receptacle to be heated. The successive turns are not necessarily all contiguous.

Generally speaking, the thickness of the insulator is small, i.e. the invention proposes that the thickness should be less than half the thickness of the conductor.

By virtue of one interesting feature which provides power whilst preserving a modular nature, the inductor is made by winding several independent conductors in parallel or in parallel series.

It may be of particular interest to wind several conductors insulated from one another simultaneously to form an inductor. These different conductors can then be placed in parallel which will increase the effective section of copper whilst maintaining skin and proximity effects in the copper, thereby reducing inductor losses. This is useful if the current in the inductor remains high in spite of the fact that the inductors are arranged in parallel, for example in professional cooking appliances where the power is high. However, the main interest of this simultaneous winding is not to further reduce the losses in the inductors but to be able to couple several generators on a same inductor by connecting them to different conductors of the inductor, in order to produce high-power cooking hobs operating on reduced-power generators.

For the purpose of the invention, the insulator is laid on the conductor before it is wound to form the inductor. This insulator may also be wound at the same time as the conductor is wound, particularly if the inductor comprises several coils wound at the same time and supplied by different generators, which may give rise to high differences in potential between the different coils. The wound insulator may even be capable of withstanding high temperatures or at least much higher than the varnishes used to provide electrical insulation for conductors, which are generally not capable or withstanding temperatures greater than 220° C. A combination of insulators would be conceivable in situations where the pre-laid insulation provides minimum insulation between turns and the wound insulation provides enhanced insulation between different coils. Finally, another interesting feature is that the insulation contains a thermo-setting resin, which will allow the assembly to be set by raising the temperature.

In order to make a cooking hob, it is of particular advantage to combine several inductors in parallel or in series/parallel on a single generator.

Four inductors may be connected in parallel, each being in phase opposition relative to its immediate neighbour so that the magnetic flux from adjacent inductors builds up underneath the load. By taking this approach, an inductor can be produced which, at a first approximation (leaving aside the effects of mutual inductance between the inductors) has an impedance under load equal to ¼ (4Z)=Z; this corresponds to the impedance of a conventional inductor but the rate of irradiation in the area immediately around the pan is very low because there are as many inductors in phase as there are inductors in phase opposition. The inductor is preferably positioned so that one face is parallel with the front of the cooking surface so that irradiation is minimised specifically in the region where the user is located.

One of the considerable advantages or arranging inductors in parallel is that the total current of the cooking hob is distributed between the inductors, i.e. I/4 in the example described above. Since losses in the inductor are a function of the square of the current $P=R_{copper} \cdot I^2$, they are divided by 16, which means that it is possible to use a single conductor with a small section to make the elementary coils. If these four inductors are connected two in series in two in parallel, the current in the two branches connected in series, assumed to be identical, will be divided by two and hence the losses by four. It may be of interest to form couplings in parallel series if several coils are wound simultaneously since, if the inductor has N turns, each coil will make only N/2 turns and it may be difficult to obtain an impedance of 4×Z on one coil, whereas the final inductor will be capable of achieving an impedance Z if the 4 coils are placed in parallel. In this latter case, it will be sufficient to achieve the impedance Z because placing two coils in series will give an impedance 2×Z and placing the two double coils in parallel will return the impedance to the desired level Z.

This type of inductor minimises losses and is therefore very economical. In practice, an inductor must produce a given impedance under load which, as an initial approximation, is a function of the geometric characteristics of the turns, the coil and the number of turns (ampere turns). Having conductors very close together significantly increases the effect of mutual inductance in the turns and makes it possible to obtain very high impedance levels with a conductor of a reduced effective length. An inductor of this type will require 15 to 20% less copper than a known inductor whilst producing superior performance.

The heat distribution in a known inductor based on a simple coil is relatively mediocre since the currents induced are zero at the centre of the load centred on the inductor and are maximum on a level with the half radius of the indicator.

For the purpose of the invention, since the inductor is replaced by elementary inductors, the "cold" zone and the "hot" are distributed in smaller zones in which the temperature is easily distributed into the receptacle by heat conduction, thereby producing more uniform heating.

Dividing the current by about 4 (for 4 inductors) is an interesting approach if the current and hence the power of the hob is high. For very high power levels, the number of coils in parallel is increased, which also has the effect increasing the size of the heating zone; these high powers are dedicated to receptacles of large diameters.

For lower powers, there is no need to divide the current and two coils in parallel will suffice. However, there will be an increase in the leakage field at the sides of the cooking surface and it is therefore useful, as with the example of several simultaneously wound coils, to make each inductor unit by connecting two inductors of an impedance Z in series and in phase opposition, the final impedance being (2Z//2Z) and the electromagnetic leakage level at the side will again be very much reduced.

By virtue of one advantageous feature along the lines explained above, the adjacent inductors are connected to the high-frequency supply to generate additional magnetic flux underneath the load.

Along the same lines of thinking, the hob has an equal number of inductors for each of the two flux directions so that the magnetic radiation is compensated over a certain distance.

It is also of interest to combine the hob with one or more temperature sensors comprising:

heat conductive strips placed between at least two adjacent inductors, these strips being connected to the actual sensor in order to transmit the temperature thereto.

If a hob has several inductors which may be used separately or in non-dedicated groups, i.e. adjacent inductors which may be combined relatively in any number, it is useful to indicate which inductors are being used and to this end the hob comprises:

an illuminated display means made up of illuminated segments mounted between two adjacent inductors, a control circuit comprising a sensor detecting the presence of an object to be heated above an inductor so as to control the illuminated segments associated with this inductor.

The modular nature of hobs made using the inductors proposed by the invention is particularly useful if each inductor is supplied by an associated generator.

Using the invention, it is possible to make induction-heated cooker hobs or more generally heating surfaces with one or more hobs, each made up of one or more associated inductors.

Within the meaning of the present invention, the expression "induction-heated cooking hob" is used indiscriminately to refer to a hob in the conventional meaning of the word, i.e. an area for heating a receptacle or a heating surface with several combined heating zones, of the type known from the prior art where a "front" hob and a "back" hob are provided, one being low power and the other high power. Unlike the prior art, however, the front hob and the back hob may be made up of several modular inductors and in particular each may comprise 4 inductors as proposed by the invention.

In order to facilitate manufacture of the induction-heated cooker hobs and improve the inductors modular nature at the stage when they are made, it is also of particular advantage if an inductor is made so that it comprises:

a top surface formed by a protective, electrically insulating and optionally heat-insulating layer underneath which the inductor is placed, a layer of material with a high magnetic permeability and low electric conductivity such as ferrite underneath the inductor in order to loop the magnetic circuit of the inductor, an electromagnetic screen which may serve as a means of dissipating the heat underneath the layer of ferrite, a printed circuit board bearing the components of the generator associated with the inductor, this board being mounted underneath the diffuser screen, the power components of the generator which need to be cooled being in thermal contact therewith, the conductor supplying the inductor being directly connected to the printed circuit.

In an inductor or group of inductors of this type, the components of the printed circuit board are located on the top face, i.e. on the side of the diffuser combined with the ferrite layer and the inductor, whilst the bottom face of the printed circuit board serves solely as a means of connecting the different components or mounting the surface-mounted miniature components (SMC).

This being the case, it is of particular advantage if the conductors of the inductor cross through the printed circuit board and are wave-soldered at the same time as the connections for the printed circuit components, at the bottom face of the printed circuit.

The inductor proposed by the invention is made by winding one or more conductors. The winding process is advantageously achieved by winding the inductor starting from its outer turns. This will guarantee to produce the requisite shape and size of the coil, which is particularly important if coils are to be placed adjacent to one another. To this end, the outer turn is placed against a matrix of a desired shape and size, and the specific winding machine forms the coil by applying turns in succession against this outer turn, the tolerance of the coil being shifted to its centre without having any particular repercussions on the characteristics of the coil.

More specifically:

the conductors of the inductor are placed so that they are pushed through the printed circuit and are wave-welded at the same time as the connections for components of the printed circuit, at the bottom face of the printed circuit, the conductor is wound forming the turns of the inductor to be produced starting from the outer turn which is made to the desired shape, and the successive turns are placed towards the interior of this outer turn, a rectangular shape, in particular a square shape, is imparted to this outer turn, several conductors are wound simultaneously to form an inductor comprising several conductors.

BRIEF DESCRIPTION OF THE DRAWINGS

The present invention will be described in more detail below with reference to the appended drawings, in which.

DETAILED DESCRIPTION OF THE INVENTION

Figure 1:
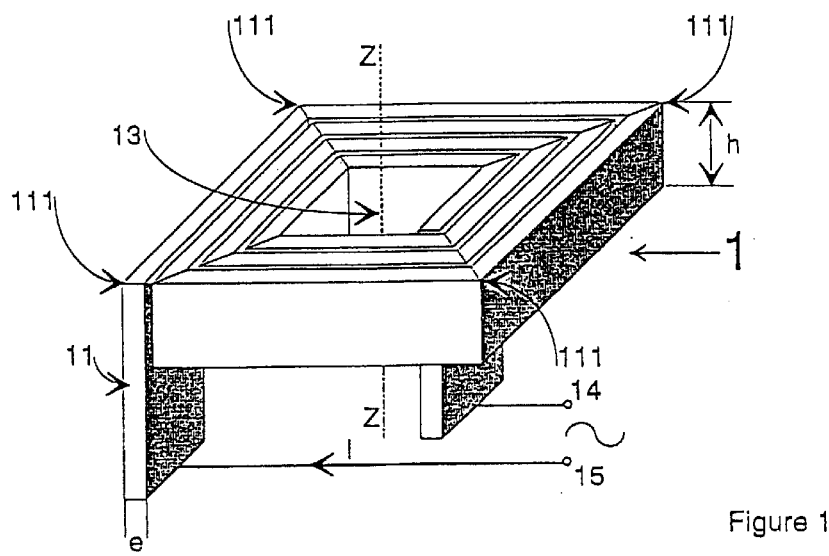
FIG. 1 is a schematic illustration in perspective of an inductor with a single conductor, as proposed by the invention.

As illustrated in the drawings, the invention relates to an induction-heated cooker hob supplied with a high-frequency current. Throughout the description, the terms "cooking" or "heating" are regarded as synonymous. The hob consists of one or more inductors such as the one schematically illustrated in FIG. 1. This inductor 1 is made up of a large number of turns formed by a conductor 11 with a rectangular section of a small thickness, i.e. of which the large side is parallel with the winding axis ZZ (vertical axis) (conductor on its edge).

The conductor 11 is found so as to assume a rectangular or square shape when seen in plan view. In the diagram given in FIG. 1, the corners 111 of the top sections are represented in an exaggerated manner. In fact, these corners or generally more or less rounded.

The winding as proposed by the invention is started from the outer turn, which is placed in an indentation of the desired shape, the winding operation continuing by placing the turns in succession against the preceding turn until the desired number of turns has been obtained.

The ends of the conductor, shown by references 14, 15, are used to supply it with electricity.

The turns of the conductor 11 are spaced apart in the illustration, i.e. they are not in contact. The space between the turns is occupied by a small thickness of insulation. For the purpose of the invention, this small thickness is a thickness which is preferably very significantly smaller than the thickness (e) of the conductor 11; this thickness (e) is in turn thin compared with the height (h) of the conductor 11.

Figure 2:
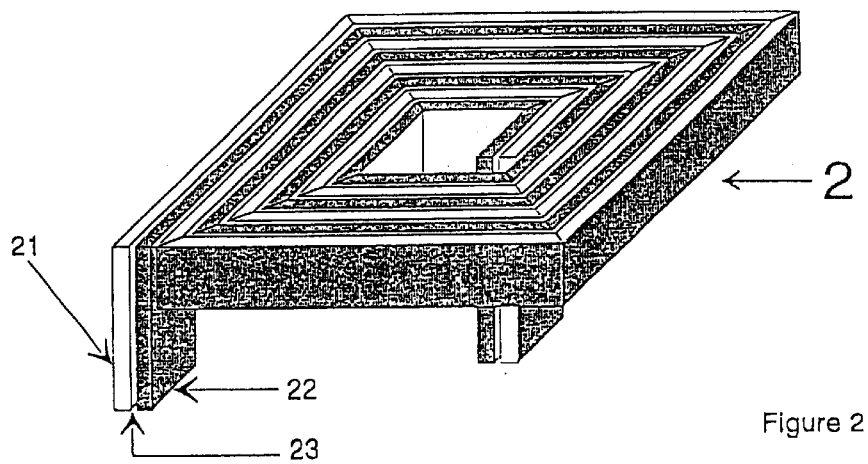
FIG. 2 is a schematic illustration in perspective of an inductor having two independent conductors.

FIG. 2 illustrates an inductor 2 with two conductors 21 and 22 and an insulation 23 between the turns of the conductor.

The inductor, which is generally rectangular in shape to make it easier to place several inductors one against the other, is made to a substantially square shape in particular.

The insulation 23 between the turns of the conductor 21 and the conductor 22 may be insulation deposited on the conductors before they are wound. This insulation may also be provided in the form of a strip wound at the same time as the conductors 21, 22. A combination of a deposited insulating material and wound insulation would also be conceivable.

Finally, this insulation may be or contain a thermosetting resin, which will allow the winding to be bonded simply by raising the temperature.

If a wound insulation is used, the top section of the inductor is not covered by the insulation. However, the section is underneath as thin as possible a layer of electrical insulation capable of withstanding temperature, such a mica, which covers the inductor in order to isolate it electrically.

Figure 3:
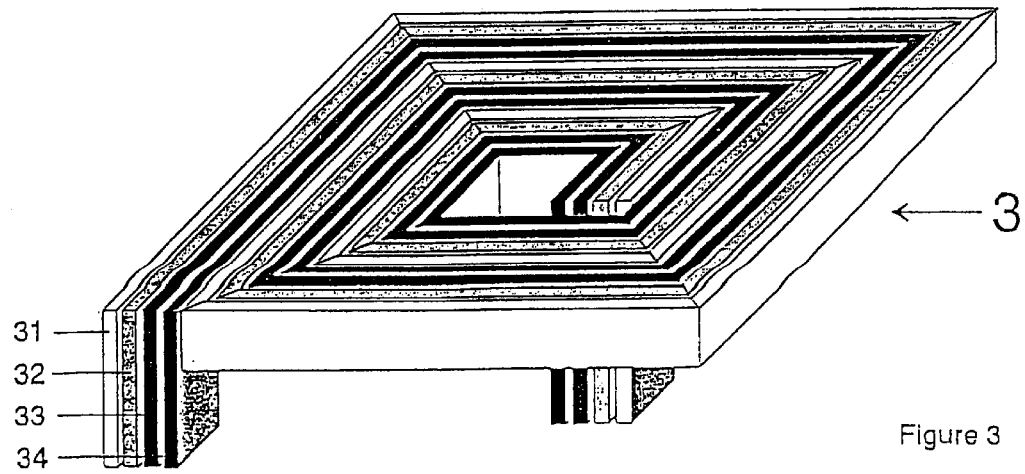
FIG. 3 is a schematic illustration in perspective of an inductor formed by winding four independent conductors.

FIG. 3 illustrates an inductor 3 made winding four conductors 31, 32, 33, 34, each separated by a fine layer of insulating between the turns, not illustrated. These four conductors 31, 32, 33, 34, rectangular in section like the conductors 21 and 22 described above, are electrically independent.

Figure 4:
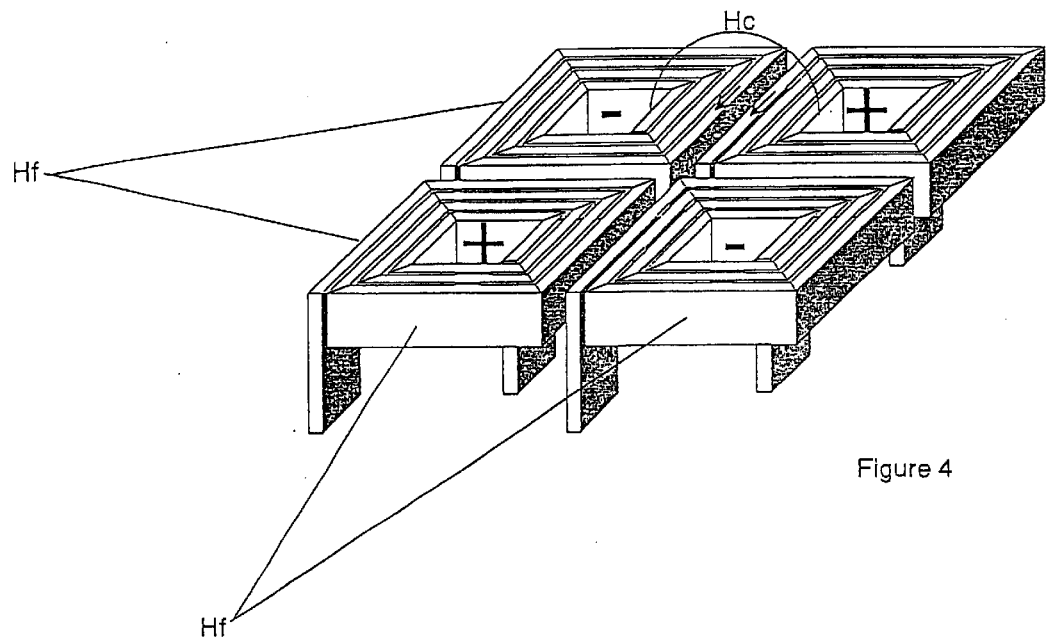
FIG. 4 is a perspective view of a group of four inductors combined to form a cooking hob.

FIG. 4 shows how four inductors 1 of the type described above are placed next to one another to form an induction-heated cooking hob, for example. These inductors may be connected in parallel or in series/parallel.

As illustrated in this drawing, in order to attenuate or even compensate the electromagnetic field across a slight distance to the side of the hob and in particular in the 4 directions, two of which are indicated by the reference Hf, the inductors are provided in pairs in phase opposition. Viewed from the points Hf, the magnetic field will therefore be made up of a part of a field in phase and an almost identical part of a field in phase opposition, the result being virtually zero. Underneath the load, the fields of two adjacent inductors will be in cumulative flux as is the case with the field Hc, for example. This allows the flux of the conductors to be combined with all therefore increase their impendance by increasing the effect of their mutual inductance and at the same time improve the distribution of induced currents and hence the temperature in the load to be heated.

This arrangement in phase opposition is generally obtained by means of the physical connection of the inductor. If using several generators to supply a cooking zone comprising several inductors, the respective phases of the inductors and hence the generators can be defined by controlling the latter. It may even be of advantage to modulate the phase in order to modulate the magnetic field on a level with the loads and in their immediate vicinity in order to apply a fine control of the power in the loads and to minimise magnetic losses.

In the various inductors described above, the conductor is preferably rectangular in section, namely its thickness is small compared with its height and it is wound on its edge. By way of example, an inductor is made by winding 50 turns in a single conductor with a section of 0.5×2 mm on a square indentation with a side of 110 mm, each turn being insulated from adjacent turns by a high-temperature electrical insulation material such as a glass braid, thickness of which is as small as possible, for example 0.1 mm. This method produces a square inductor with a side of 110 mm, the square centre of which will have a side of 110−2×50×(0.5+2×0.1))=40 mm and whose impedance under load, i.e. in the presence of an adapted receptacle, is approximately 4 times the impedance (L,R) under load of a conventional inductor of much larger dimensions (diameter of 220 mm, for example).

Generally speaking, it is not an easy matter to combine generally because the loads will be different. Making the inductors by this method ensures that the impedance levels of the different conductors under load will be almost identical and hence will make it possible to combine the generators, which will then be able to work at identical frequencies, without any major difficulties. However, this multiplication of conductors increases the space between the conductors connected to a same generator and hence the dimensions of the inductor, which is not a problem because the hob will then be a high-power hob capable of transmitting the power of several generators. It is of advantage not to connect all the indicators in parallel but to arrange branches in series/parallel, which will require a lesser number of turns for the elementary inductors.

An interesting extension is to reduce the copper section and insulation still further as well as the dimensions of the outer turn so as to produce very small inductors units in which the impedance will be very high. For example, an inductor could be made with 60 turns of 0.2 mm width by 2 mm height with an insulation of 0.1 mm between turns having a square shape with a side of 50 mm, in which case the inner square will have a side=50−2×60×(0.2+0.1))=14 mm.

A hob can be made by connecting these indicator units in parallel or in parallel series and the global magnetic radiation is significantly reduced whilst the heat distribution is also greatly improved.

This principle means that a full range of cooking hobs of different sizes can be made by adding elementary inductors so that there will always be a number of inductors in phase substantially equal to the number of inductors in phase opposition.

Adding inductors in parallel decreases the global impedance of the inductor and therefore increases the current and the cooking surface. This allows a return to the big hob—big power logic, which was impossible using simple inductors where the greater the number of turns the higher the impedance and the lower the current if the surface area of the hob is increased.

In such a system, adapting the size of the receptacle to the size of the hob is less important because if a load is covering an inductor, its inductance diminishes sharply and since the reactance $L\psi$ is greater than R, the global impedance $Z=R+j\cdot L\cdot \psi$ of the covered inductor decreases so that the current in the inductors located underneath the load increases. The other inductors are powered but the fact that they are small and in phase opposition considerably reduces the leakage field of the system. As a result of the invention, it is therefore possible to propose heating surfaces which are capable of adapting to receptacles of varied diameters and shapes whilst minimising the leakage fields and optimising the distribution of heat through the receptacles.

Figure 5:
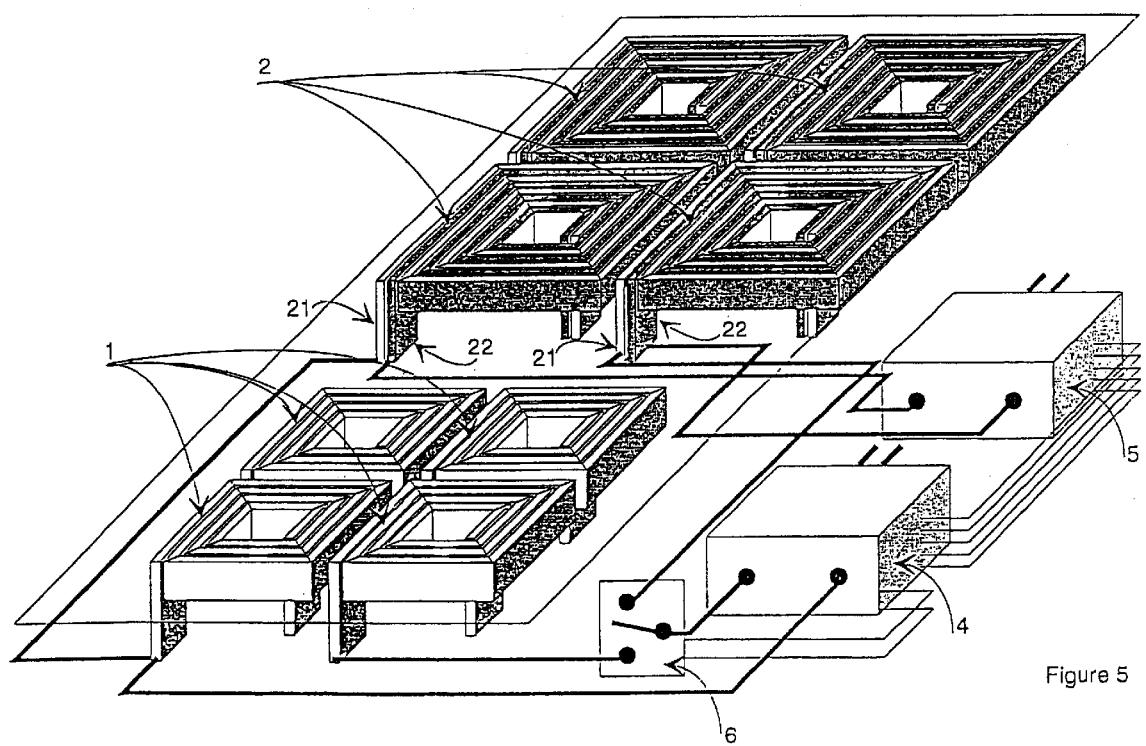
FIG. 5 is a perspective view of a cooking surface comprising a front hob and a back hob.

FIG. 5 illustrates a heating or cooking surface having four inductors 1 of the type illustrated in FIG. 1 and four inductors 2 of the type illustrated in FIG. 2. The inductors 1 form a cooking hob in the usual meaning of the word as do the inductors 2. A thin line is shown surrounding the actual cooking surface.

In fact, the inductors 1 constitute the "front" hob of normal power and the inductors 2 constitute a "back" high-power hob, the overall assembly forming a two "burner" cooking plate.

The inductors 1 are supplied by a generator 4 and the inductors 2 by a generator 5. In fact, only the conductor 22 (see FIG. 2) of the inductors 2 is supplied by the generator 5 whilst the conductor 21 is supplied by the generator 4 via a switching device 6.

This switching device 6 allows the generator 4 to be connected, on command, either to the inductors 1 or to the second conductor 11 of the inductors 2. For the sake of simplicity, the front inductors and the part 21 of the back inductors 21 have a common electric point which allows a simplified switching device to be used. The different conductors making up the hobs are connected to one another, as described above, in parallel or in parallel series before being connected to the switching device.

This cooking unit issues a power which may be controlled between 0 and a maximum value P on the two hobs independently, the rear back of larger dimensions being better suited to receptacles of a large size. If necessary because this hob needs a high power, the front hob is temporarily shut down and the two generators are connected to the back hob, to which they deliver a controllable power from 0 to 2×P.

Figure 6:
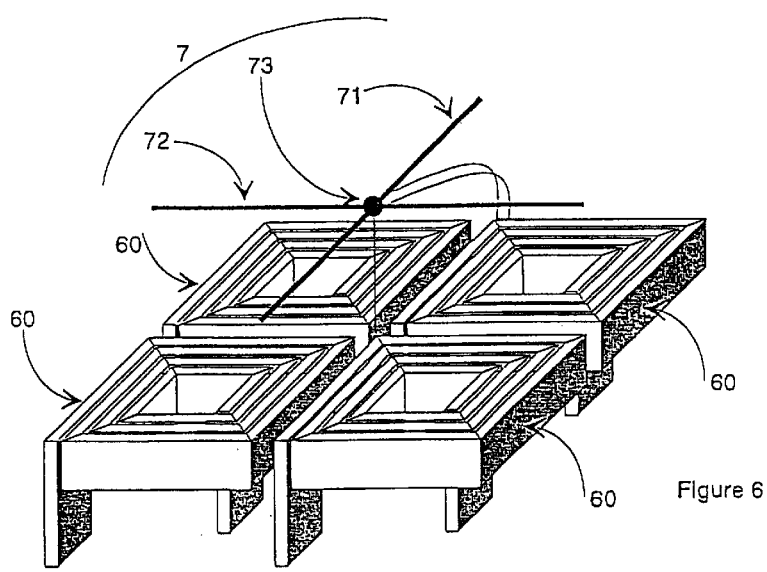
FIG. 6 is a schematic illustration in perspective showing the design and positioning of the temperature sensor.

FIG. 6 shows the positioning of a temperature sensor between the coils comprising the hob. In a conventional system, a heat-conductive metal strip such as copper or aluminum is sometimes used, and is arranged covering a part of the hob, its purpose being to pass averaged data relating to the temperature of the load to a sensor located at the centre of the hob in the zone where the inductor field is almost zero. In the case of high-frequency inductors, this strip is punched out so as to avoid as far as possible transforming any currents induced therein and it is of reduced dimensions.

In spite of this, this strip is nevertheless the site of Eddy currents since it is in the maximum field of the inductors and, being positioned above the inductor, it generates an air gap which is harmful to the efficiency of the system.

In this case, it is possible to use a much simpler element, a thin plate or wire, and to place this element outside the main field of the coils whilst still remaining in the heating zone of the hob, as illustrated on one page of the drawings, although this layout is not restrictive. This system may consist of two flat wires in the shape of a cross, the centre of the cross being placed on the sensor, which may be of the CTN type for example, used to measure the temperature of the hob in a manner that provides sufficient thermal contact. This system does not require any extra thickness and is the site of only very limited induced currents. It has a large area of action and is very economical to produce.

FIG. 6 illustrates this layout of inductors 60 in a chequer board arrangement which allows a temperature sensor 7 having heat-conductive arms 71 and 72 to be placed in the space between four inductors 60. Each arm is placed in a cross layout in the space between two adjacent inductors. The arms 71 and 72 transfer the temperature which they pick up to the central point 73 where a temperature-sensitive element is placed (not illustrated). This will therefore receive an average temperature; it is connected to the control circuit of the hob in order to prevent overheating of the hob and its load in the event of poor controls or optionally in order assist the temperature by regulating the power.

It is also possible to place illuminated segments between the inductors, connected to a control circuit, not illustrated, comprising a sensor which detects the presence on the inductor or inductors of an object to be heated and controls the lighting of the assembly of illuminating segments surrounding the heating zone used. Advantageously and in a known manner, the variation in the impedance of the inductors when they are covered by a load is used as a sensor. A feature such as this is of advantage if the inductors are not associated with a specific hob but globally constitute a heating surface which can be used in a very flexible manner without having specifically localised hobs. Advantageously, this lighting device is supplied by the magnetic field of the inductors which it surrounds. This allows the lighting power to be modulated depending on the power of the hobs. This device results in it no longer being necessary to use serigraphy on the cooking planes in order to define the heating zones. This being the case, it would be conceivable to assign colours to the different hobs.

Figure 7:
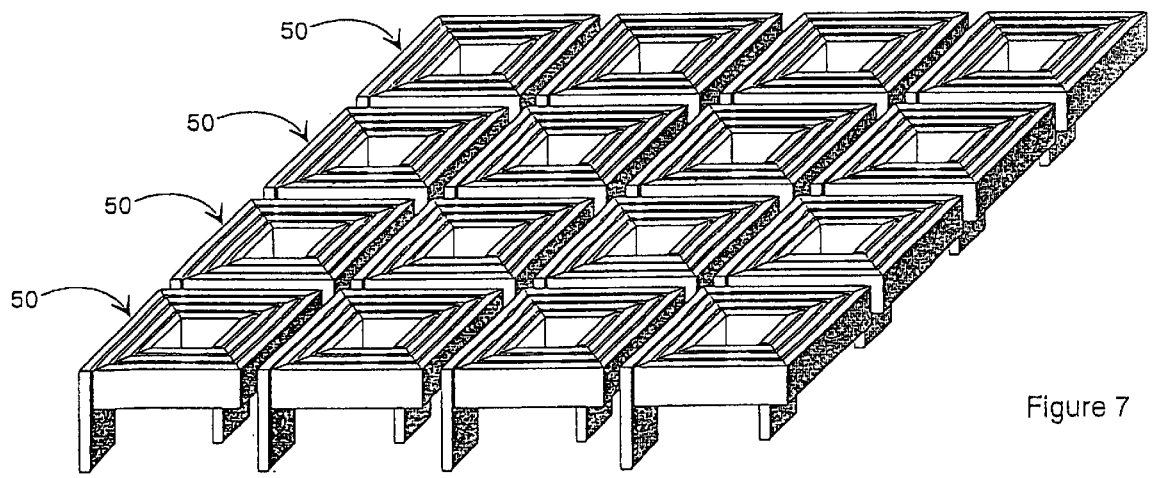
FIG. 7 shows a set of inductors as proposed by the invention, combined to form a hob with a non-dedicated heating zone.

FIG. 7 illustrates an assembly of inductors 50 of the type described above. These inductors are arranged adjacent to one another and can be connected to generators, not illustrated, as units or in packs of inductors, depending on the power to be supplied and the type of inductors used.

Figure 8:
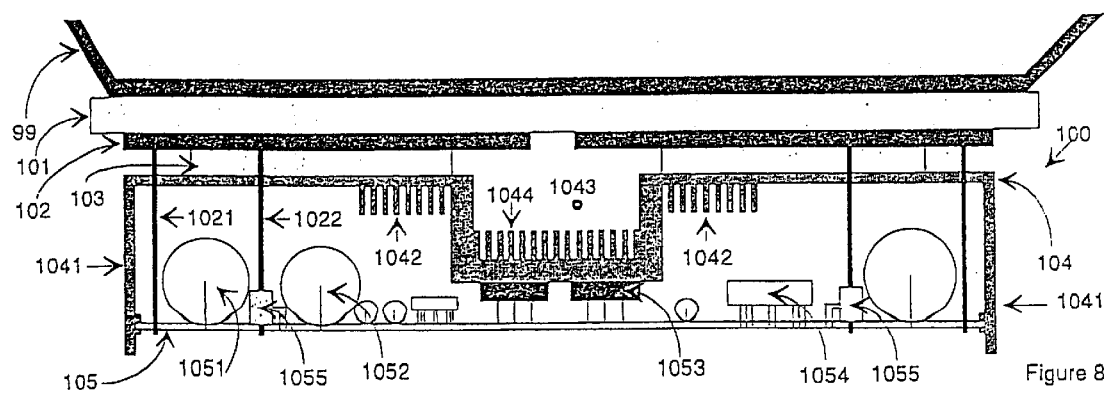
FIG. 8 is a view in cross section of an inductor or group of conductors combined with its/their generator(s).

FIG. 8 is a very schematic diagram showing a cross section of a hob 100 as proposed by the invention.

This hob consists of a protective layer 101, made from ceramic glass for example, which constitutes the surface on which the object to be heated 99 is placed. Underneath the protective and electrically (possibly heat) insulating layer 101 is the winding or windings 102 constituting the inductor. Underneath this inductor is a layer of material which has a high magnetic permeability and a low electric conductivity such as ferrite 103, which loops the magnetic circuit, and, underneath the ferrite layer, is a diffuser 104 (heat exchanger), preferably made from aluminum which, at the same time as it evacuates the heat, forms an anti-magnetic screen towards the bottom. Underneath this diffuser 104, which may have recessed edges 1041 and heat exchanger fins 1042, is a printed circuit board 105 on which the components 1051, 1052, 1053, 1054, 1055 of the high-frequency generator are mounted. These components 1051–1055 are placed on the top of the board 105 and their pins pass through the board 105 so that they can be soldered.

The diffuser 104 forms a venting channel 1043 with fins 1044 directed towards the channel on the side of the inductor 102; an air flow generated by a fan, not illustrated, is fed through the channel.

The pins 1021, 1022 of the winding of the inductor 102 also pass through the unit as well as the printed circuit board 105, extending downwards beyond them. Having assembled the unit in this simple manner, it is of particular advantage to solder the connectors 1021, 1022 directly onto the printed circuit board 105 by wave-welding, for example. This type of connection is made possible because the current is divided in the arms of the inductors mounted in parallel. In effect, the current in a conventional inductor is several tens of amperes which requires a power connection generally applied by a system of screwed spade connectors which is an onerous task. The fact of either splitting the current in parallel branches or of using lower-power generators in conjunction with the use of a flat type of conductor for the indicator means that it is possible to solder this flat section directly, optionally after removing its electrical isolating varnish, onto the power supply printed circuit board, which is a particularly economical approach. Advantageously, before they cross through the board 105, one or more of the inductor pins pass through one or more current sensors 1055 making it possible to ascertain whether current is passing through one or several inductors.

Apart from being modular in nature, a configuration of this type has the advantage of being particularly compact and allows the thickness of induction-heated cooking appliances to be reduced.

It may also be of advantage to incorporate with each conductor as a unit its electrical insulation, its magnetic circuit, its screen and generally speaking all the elements it requires, in an assembly of inductors and to consider this inductor as a standard component which can then be connected to the printed circuit of the power board.

Finally, the common heat exchanger which may be made in a single part or from several parts in heat contact, may be connected to a filtered potential of the electronic power board in order to limit capacitive currents between the inductor and its load. Advantageous, this electrical connection can be naturally made via a power component which is mounted directly on the heat exchanger without any insulation, for example the collector of a power transistor connected to its casing.

The venting means supplied with the inductor vent, the diffuser and the electronic circuit; these means are not illustrated. Advantageously, a fan is used to cool several modules. This inductor unit is particularly easy to cool because of the space remaining between adjacent coils which allows are to flow through.

What is claimed is:

1. An inductor for a cooking hob comprising:
   a wound conductor with a rectangular cross section having a plurality of turns, each turn being a substantially a right angle to a previous turn and at substantially a right angle to a next turn; and
   a layer if insulation having a plurality of turns, each turn being at substantially a right angle to a previous turn and at substantially a right angle to a next turn, the layer of insulation being adjacent to the conductor and located between adjacent turns of the conductor, and being thinner than the thickness of the conductor.

2. The inductor for a cooking hob of claim 1, wherein the inductor further comprises
   a second wound conductor with a rectangular cross section having a plurality of turns, each turn being at substantially a right angle to a previous turn and at substantially a right angle to a next turn; and
   a second layer of insulation having a plurality of turns, each turn being at substantially a right angle to a previous turn and at a substantially a right angle to a next turn, the layer of insulation being adjacent to the conductor and located between adjacent turns of the conductor, and being thinner than the thickness of the conductor;
   wherein the second conductor and second layer of insulation are wound in parallel with the conductor and the layer of insulation.

3. A cooking hob comprising:
   an inductor, the inductor comprising
   a wound conductor with a rectangular cross section having a plurality of turns, each turn being at substantially a right angle to a previous turn and at substantially a right angle to a next turn; and
   a layer of insulation having a plurality of turns, each turn being at substantially a right angle to a previous turn and at substantially a right angle to a next turn, the layer of insulation being adjacent to the conductor, and located between adjacent turns of the conductor, and being thinner than the thickness of the conductor;
   a generator connected to the inductor for supplying power thereto.

4. The cooking hob of claim 3, further comprising:
   at least one additional inductor spaced apart from the inductor, the additional inductor comprising:
   a wound conductor with a rectangular cross section having a plurality of turns, each turn being at substantially a right angle to a previous turn and a substantially a right angle to a next turn;
   a layer of insulation having a plurality of turns, each turn being at substantially a right angle to a previous turn and at a substantially a right angle to a next turn, the layer of insulation being adjacent to the conductor, and located between adjacent turns of the conductor, and being thinner than the thickness of the conductor;
   wherein the inductor and the at least one additional inductor are in spaced apart relation to one another.

5. The cooking hob of claim 4, wherein the generator supplies power to the inductor and the at least one additional inductor.

6. The cooking hob of claim 4, wherein the inductor and the additional inductor generate flux, and the inductors are arranged so that flux is cumulative.

7. The cooking hob of claim 6, wherein there are an equal number of inductors per direction of flux.

8. The cooking hob of claim 4, further comprising:
   a temperature sensor having heat conductive strips placed between the inductor and the at least one additional inductor, the strips measuring temperature data.

9. The cooking hob of claim 4, further comprising:
   an illuminated indicator made up of illuminated segments mounted between the inductor and the at least one additional inductor;
   a control circuit having a presence sensor to detect the presence of object above an inductor, the control circuit controlling the illuminated segment associated with the inductor in contact with said object.

10. The cooking hob of claim 4, further comprising:

a temperature sensor for detecting temperature between the inductor and the at least one additional inductor.

11. The cooking hob of claim 4, further comprising:

an illuminatable segment between the inductor and at least one additional inductor, said segment including a sensor for detecting the presence of an object to be heated and illuminating in response to presence of said object.

12. The cooking hob of claim 11, wherein the illumination of the illuminatable segment is proportional to temperature in the inductor and the at least one additional inductor.

13. The cooking hob of claim 3, wherein the inductor further comprises:

a second wound conductor with a rectangular cross section having a plurality of turns, each turn being at substantially a right angle to a previous turn and at substantially a right angle to a next turn; and a second layer of insulation having a plurality of turns, each turn being at substantially a right angle to a previous turn and at substantially a right angle to a next turn, the layer of insulation being adjacent to the conductor, and located between adjacent turns of the conductor, and being thinner than the thickness of the conductor;

wherein the second conductor and second layer of insulation are wound in parallel with the conductor and layer of insulation.

14. The cooking hob of claim 3, further comprising;

a temperature sensor for detecting temperature near an inductor.

15. The cooking hob of claim 3, further comprising:

a temperature sensor for detecting temperature of an inductor.

16. A cooking hub supplied with a high frequency electric conductor comprising:

a wound conductor with a rectangular cross section having a plurality of turns, each turn being at substantially a right angle to a previous turn and at substantially a right angle to a next turn; and a layer of insulation having a plurality of turns, each turn being at substantially a right angle to a previous turn and at substantially a right angle to a next turn, the layer of insulation being adjacent to the conductor, and located between adjacent turns of the conductor, and being thinner than the thickness of the conductor, wherein the generator supplies power to the indicator, a top surface formed by a protective electrically insulating layer underneath which the inductor is placed;

a layer of ferrite underneath the inductor in order to loop the magnetic circuit of the inductor;

a heat diffuser forming a magnetic screen underneath the layer of ferrite;

a printed circuit board bearing the components of the generator associated with the inductor, this board being mounted underneath the diffuser, power components of the board being in heat-conduction contact therewith;

the conductors being directly connected to the printed circuit;

at least one of the supply conductors of the inductor passing through current sensors prior to the supply conductors being connected to the printed circuit.

17. A hob as claimed in claim 16 wherein the diffuser is made from a single part and the diffuser forms a ventilation passage on the side directed towards the coil and heat-exchanger fins project into this passage.

18. A hob as claimed in claim 16 wherein the difuser is made of more than one part, each part being in heat transfer contact with another part, and the diffuser forms a ventilation passage on the side directed towards the coil and heat-exchanger fins project into this passage.

19. A hob as claimed in claim 16, wherein at least one of the power components is in direct electrical contact with the diffuser.

* * * * *

UNITED STATES PATENT AND TRADEMARK OFFICE
CERTIFICATE OF CORRECTION

PATENT NO. : 6,498,325 B1
DATED : December 24, 2002
INVENTOR(S) : Dominique Akel and Henri Schlumberger It is certified that error appears in the above-identified patent and that said Letters Patent is hereby corrected as shown below:

<u>Title page,</u>
Item [30], insert the following:
-- [30]    Foreign Application Priority Data
Apr. 9, 1999 (FR) .......................................... 99 04 451 --

Signed and Sealed this

Eleventh Day of November, 2003

JAMES E. ROGAN
*Director of the United States Patent and Trademark Office*